United States Patent
Hsieh et al.

(10) Patent No.: US 8,917,241 B2
(45) Date of Patent: Dec. 23, 2014

(54) POINTING DEVICE, OPERATING METHOD THEREOF AND RELATIVE MULTIMEDIA INTERACTIVE SYSTEM

(71) Applicant: Cywee Group Limited, Road Town, Tortola (VG)

(72) Inventors: Ching-Lin Hsieh, Taoyuan County (TW); Chin-Lung Lee, Taoyuan County (TW); Shun-Nan Liou, Kaohsiung (TW); Ying-Ko Lu, Taoyuan County (TW); Zhou Ye, Foster City, CA (US)

(73) Assignee: Cywee Group Limited, Tortola (VG)

( * ) Notice: Subject to any disclaimer, the term of this patent is extended or adjusted under 35 U.S.C. 154(b) by 144 days.

(21) Appl. No.: 13/737,516

(22) Filed: Jan. 9, 2013

(65) Prior Publication Data

US 2013/0234940 A1 Sep. 12, 2013

Related U.S. Application Data

(60) Provisional application No. 61/585,193, filed on Jan. 10, 2012.

(51) Int. Cl.
| | |
|---|---|
| *G09G 5/08* | (2006.01) |
| *G06F 3/033* | (2013.01) |
| *G06F 3/0346* | (2013.01) |
| *G06F 3/038* | (2013.01) |

(52) U.S. Cl.
CPC .............. *G06F 3/033* (2013.01); *G06F 3/0346* (2013.01); *G06F 3/038* (2013.01)
USPC .......................................... 345/158; 345/157

(58) Field of Classification Search
USPC ................................................. 345/156–172
See application file for complete search history.

(56) References Cited

U.S. PATENT DOCUMENTS

| | | | |
|---|---|---|---|
| 2007/0080940 A1* | 4/2007 | Aoki et al. ..................... | 345/158 |
| 2009/0128489 A1* | 5/2009 | Liberty et al. ................ | 345/158 |
| 2011/0072309 A1* | 3/2011 | Sakai et al. .................... | 714/35 |
| 2011/0109545 A1* | 5/2011 | Touma et al. ................. | 345/158 |
| 2011/0163952 A1* | 7/2011 | Hong et al. .................... | 345/157 |
| 2012/0113001 A1* | 5/2012 | Yamauchi et al. ............. | 345/157 |
| 2012/0154449 A1* | 6/2012 | Ramagem et al. ............. | 345/684 |
| 2012/0206350 A1* | 8/2012 | Figaro et al. .................. | 345/158 |
| 2012/0268369 A1* | 10/2012 | Kikkeri ......................... | 345/157 |

* cited by examiner

*Primary Examiner* — Premal Patel
(74) *Attorney, Agent, or Firm* — Alan D. Kamrath; Kamrath IP Lawfirm, P.A.

(57) ABSTRACT

An operating method of a display device includes controlling a shift of a cursor of a user interface reference frame according to a shift of the pointing device with reference to an initial point in a 3D spatial reference frame; and updating a position of the initial point in the 3D spatial reference frame according to an updating signal. An advantage of the present invention is when the operating range is changed, reference coordinates utilized by the pointing device are appropriately adjusted, so as to lower the affect of offset, allowing the pointing device to be applied in different areas/directions without having the cursor displayed on the display device to incorrectly reflect shift of the pointing device.

4 Claims, 13 Drawing Sheets

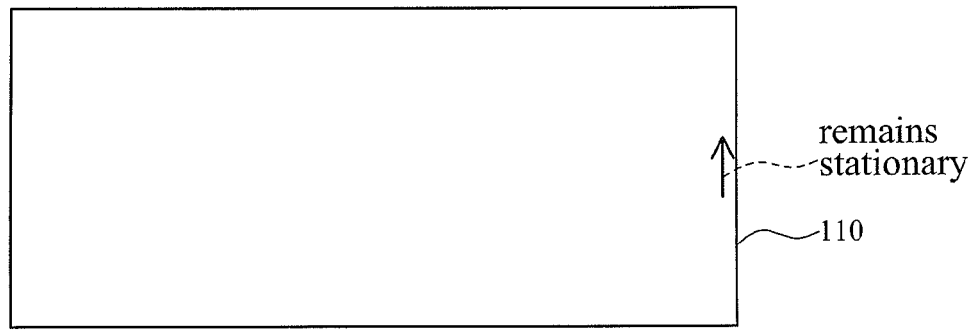
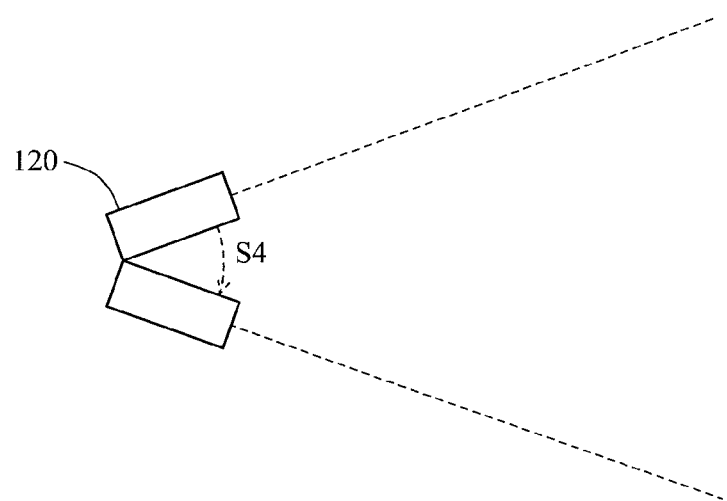
FIG. 2B(PRIOR ART)

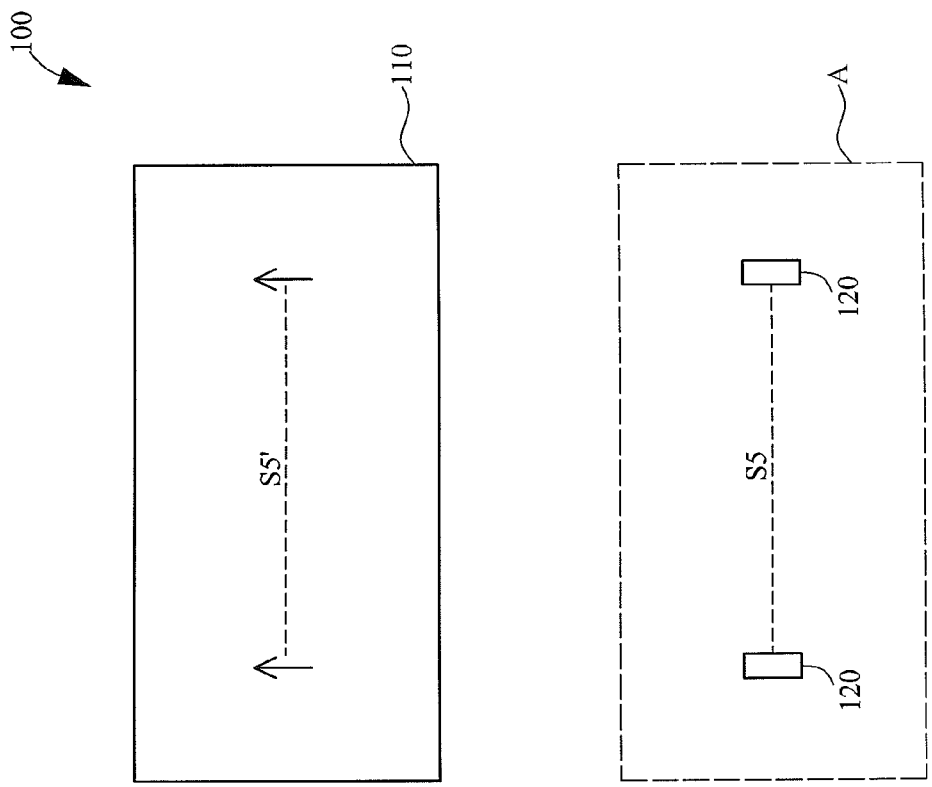

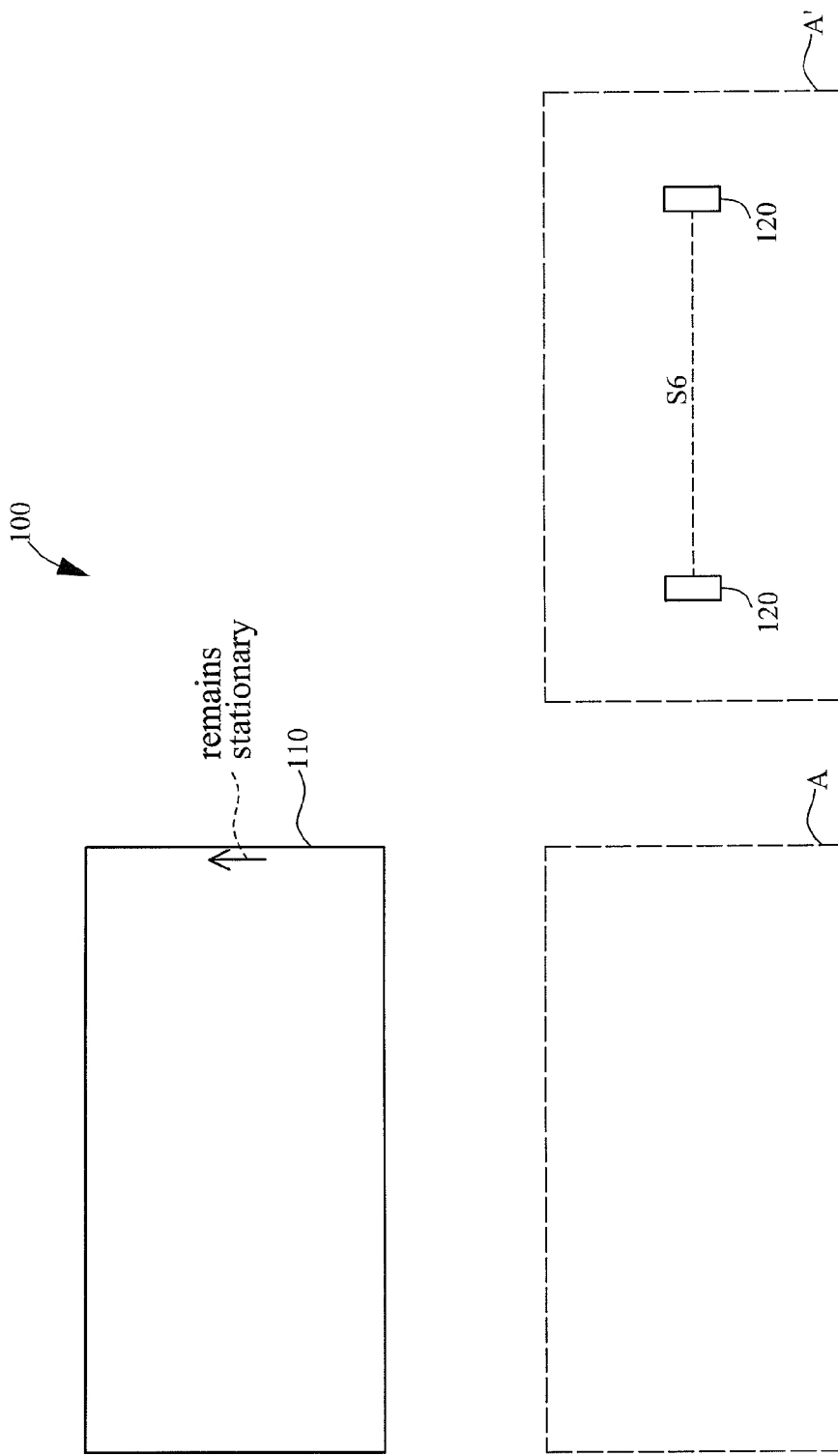

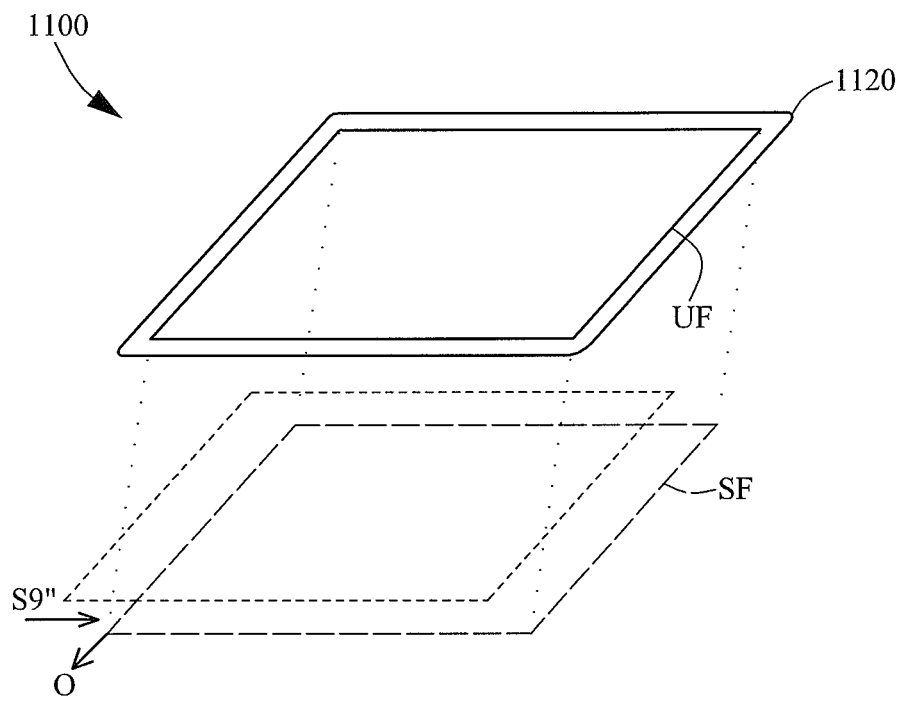
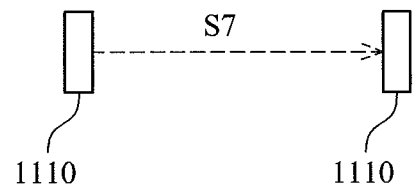
FIG. 6B

POINTING DEVICE, OPERATING METHOD THEREOF AND RELATIVE MULTIMEDIA INTERACTIVE SYSTEM

FIELD OF THE INVENTION

The present invention is related to a multimedia interactive system, and more particularly, to a pointing device and an operating method thereof of the multimedia interactive system.

BACKGROUND OF THE INVENTION

Please refer to FIG. 1. FIG. 1 is a diagram illustrating movement restriction of a conventional multimedia interactive system 100. The multimedia interactive system 100 comprises a display device 110 and a pointing device 120. The pointing device 120 can be, for instance, an air mouse, a remote controller, a control handle of a gaming console or a laser pointer, etc., for controlling a cursor displayed on the display device 110. For instance, the cursor displayed on the display device 110 moves according to orientation, direction and distance of the movement of the pointing device 120. Accordingly, the display device 110 also displays movement trajectory and position-after-movement of the cursor according to such movement of the pointing device 120. Further, a position of the pointing device 120 can be represented by factors such as yaw angle, pitch angle and roll angle in a three-dimensional (3D) spatial reference frame.

In FIG. 1, an initial position of the cursor is set to be L1' and an initial position of the pointing device 120 is L1. When the pointing device 120 moves towards right to a position L2, the shift is S1. The shift S1 will lead the cursor to make a shift S1' and the cursor reaches a border (i.e. position L2') of the display device 110. When the pointing device 120 continues to move towards right to a position L3, the shift is S2, but the cursor cannot continue to move towards right accordingly since the cursor has already reached the border of the display device 120, so the cursors stops at the border of the display device 110 (i.e. the cursor remains at the position L2').

Afterwards, the pointing device 120 then moves back (i.e. moves towards left) to the position L2 and the shift is S2. The shift S2 will lead the cursor to make a shift S2', so as to move from the position L2' to a position L3'. The pointing device 120 then moves back (i.e. moves towards left) again to the initial position L1 and the corresponding shift is S1. The shift S1 will make the cursor to perform shift S1' so the cursor is moved from the position L3' to the position L4'. Although the pointing device 120 moves towards right at first then moves towards left to get back to the initial position L1, the cursor cannot get back to the initial position L1' due to restriction of the border of the display device 110. In other words, in the conventional multimedia interactive system 100, a maximum limit exists for shift of the pointing device 120. If the maximum limit is exceeded, reset/recalibration is needed to restore the interaction between the cursor and the pointing device 120 back to normal.

Please refer to FIG. 2A and FIG. 2B. FIG. 2A and FIG. 2B are diagrams illustrating rotation restriction of the conventional multimedia interactive system 100. FIG. 2A illustrates when the rotation of the pointing device 120 is within a permissible range and FIG. 2B illustrates when the rotation of the pointing device 120 is out of the permissible range. In FIG. 2A, a rotation angle S3 of the pointing device 120 is within the permissible range, so the cursor displayed on the display device 110 makes a shift S3' accordingly. In FIG. 2B, a rotation angle S4 of the pointing device 120 exceeds the permissible range, so although the cursor displayed on the display device 110 moves accordingly, but the cursor will stop at the border of the display device 110 due to restriction of the border of the display device 110. More specifically, the pointing device 120 continues transmitting signals of moving outwards, for the cursor to move outwards continuously, but due to restriction of the border of the display device 110, the cursor appears to be stationary to the user. For instance, the pointing device 120 can be a laser pointer. In FIG. 2A the later pointer points to the display device 110, for controlling movement of the cursor accordingly. In FIG. 2B the laser pointer points in a direction away from the display device 110, hence the permissible range is exceeded for the cursor to appear to be stationary.

Please refer to FIG. 3A and FIG. 3B. FIG. 3A and FIG. 3B are diagrams illustrating region restriction of the conventional multimedia interactive system 100. FIG. 3A is a diagram illustrating when an operating range of the pointing device 120 is within a permissible region. FIG. 3B is a diagram illustrating when the operating range of the pointing device 120 is beyond the permissible region. In FIG. 3A, the pointing device 120 makes a shift S5 in a permissible region A, hence the cursor displayed on the display device 110 also makes a shift S5' accordingly. In FIG. 3B, the pointing device 120 is changed to operate in a region A' which is beyond the permissible region A. Hence in FIG. 3B the shift S6 of the pointing device 120 in the region A' cannot lead the cursor displayed on the display device 110 to move accordingly, and the cursor can only stop at the border of the display device 110. For instance, the pointing device 120 can be a laser pointer. In FIG. 3A the laser pointer is in front of the display device 110 so the cursor can be controlled with the laser pointer. In FIG. 3B a position of the laser pointer is far away from the display device 110, hence the permissible range is exceeded and the cursor cannot be controlled by the laser pointer.

Therefore as described above, in the conventional multimedia interactive system, operation of the pointing device encounters a lot of restrictions, causing inconveniences.

SUMMARY OF THE INVENTION

An embodiment of the present invention discloses an operating method of a pointing device. The operating method comprises controlling a shift of a cursor in a user interface reference frame according to a shift of the pointing device with reference to an initial point in a 3D (three-dimensional) spatial reference frame; and updating a position of the initial point in the 3D spatial reference frame according to an updating signal.

Another embodiment of the present invention discloses a pointing device. The pointing device comprises a pointing module, a control module and an updating module. The pointing module is for detecting and storing a shift of the pointing module. The control module is for controlling a shift of a cursor in a user interface reference frame, according to the shift of the pointing module. The shift of the pointing module is referenced according to an initial point of a 3D spatial reference frame. The updating module is for updating a position of the initial point of the 3D spatial reference frame according to an updating signal.

Another embodiment of the present invention discloses a multimedia interactive system. The multimedia interactive system comprises a pointing device and a display device. The pointing device comprises pointing module. The pointing module comprises a motion sensing unit and a data transmission unit. The motion sensing unit is for detecting rotating behavior, acceleration or magnetic field of the pointing module. The data transmission unit is for transmitting data detected by the motion sensing unit. The display device comprises a processing unit, a control module, an updating module and a display module. The processing unit is for performing an algorithm calculation to data transmitted by the data transmission unit, so as to generate a shift of the pointing module. The shift of the pointing module is referenced according to an initial point of a 3D spatial reference frame. The control module is for controlling a shift of a cursor in a user interface reference frame, according to the shift of the pointing module. The updating module is for updating a position of the initial point of the 3D spatial reference frame according to an updating signal. The display module is for displaying the cursor and the user interface reference frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2A and FIG. 2B are diagrams illustrating rotation restriction of the conventional multimedia interactive system.

FIG. 3A and FIG. 3B are diagrams illustrating region restriction of the conventional multimedia interactive system.

FIG. 6A, FIG. 6B and FIG. 6C are diagrams illustrating a multimedia interactive system under the second condition for generating the updating signal according to the first embodiment of the present invention.

DETAILED DESCRIPTION OF THE INVENTION

Figure 1:
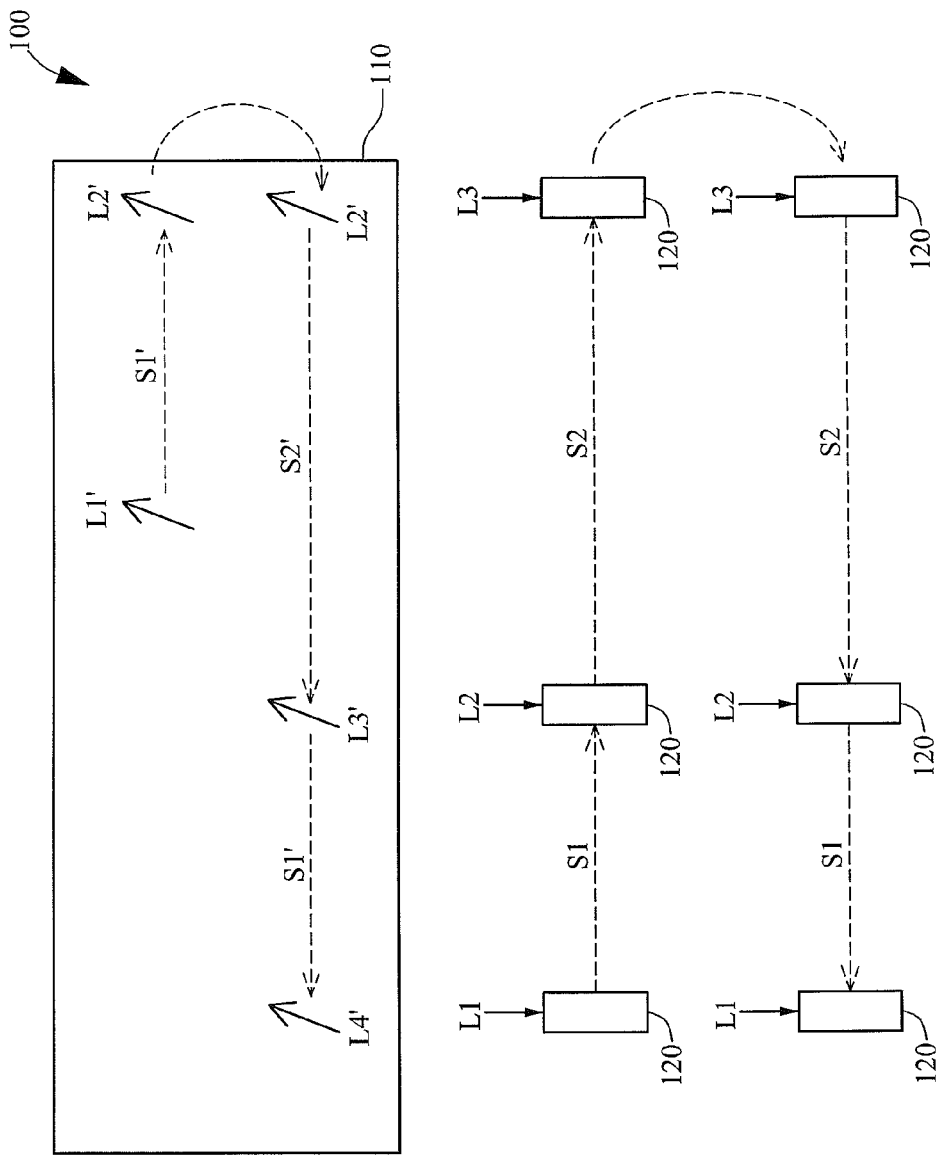
FIG. 1 is a diagram illustrating movement restriction of a conventional multimedia interactive system.
Figure 2A:
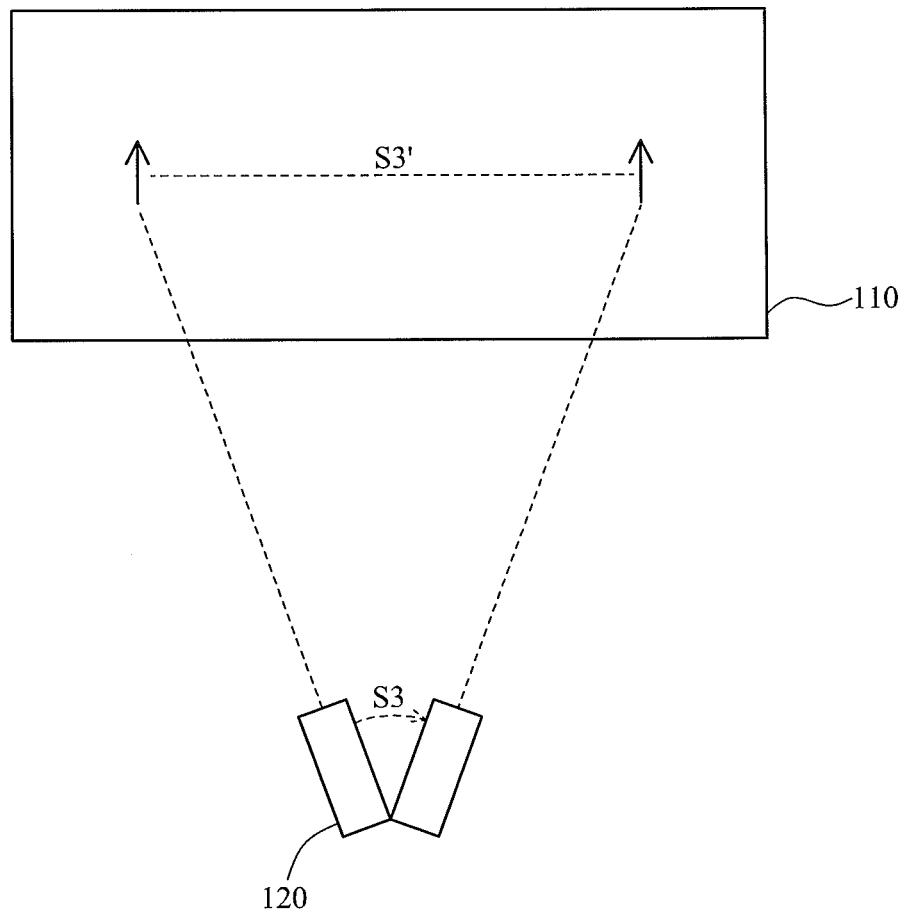
Figure 4:
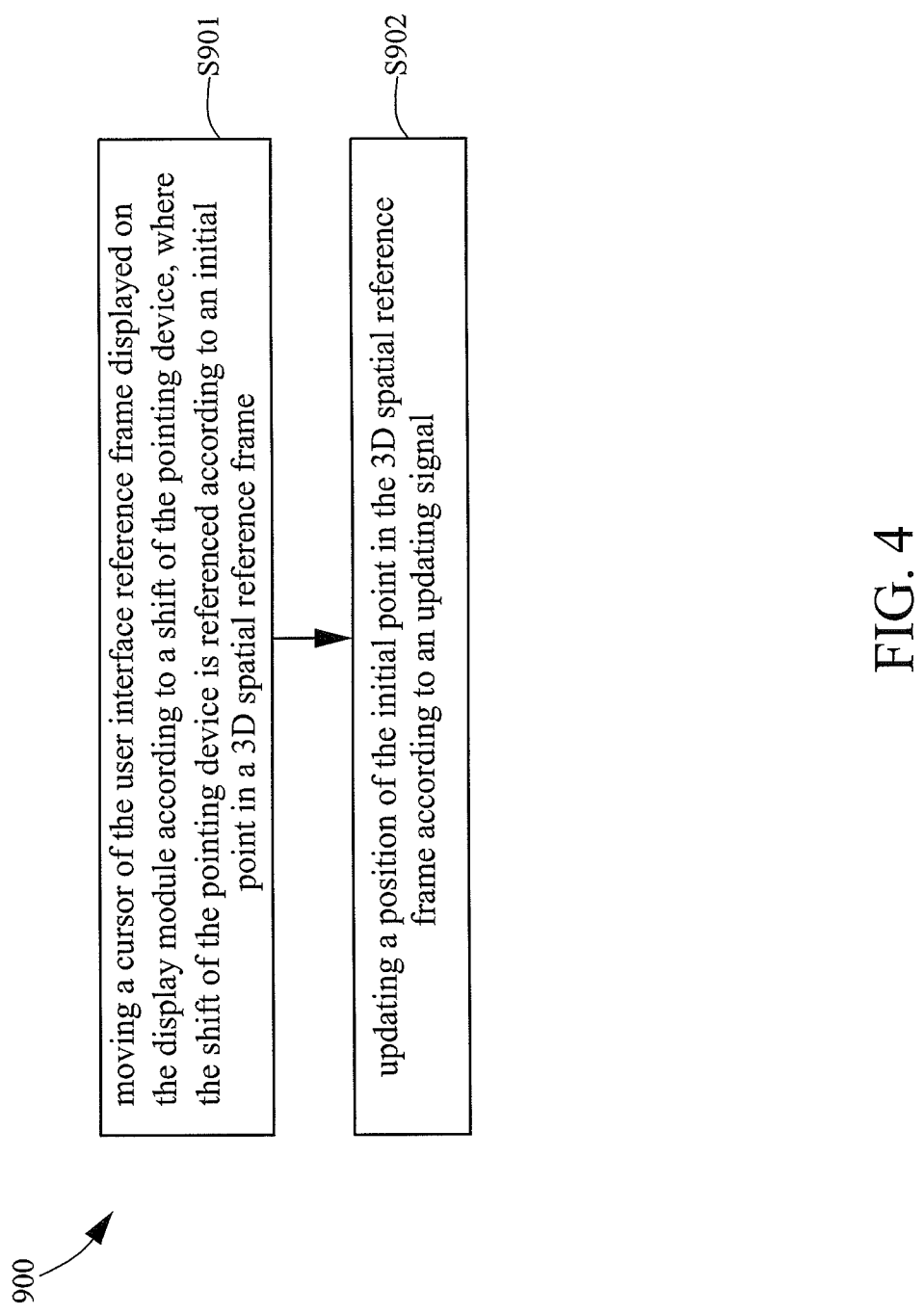
FIG. 4 is a flow chart illustrating an operating method 900 of a pointing device according to a first embodiment of the present invention.

Please refer to FIG. 4. FIG. 4 is a flow chart illustrating an operating method 900 of a pointing device according to a first embodiment of the present invention. Steps of the operating method 900 include:

Step S901: moving a cursor of the user interface reference frame displayed on the display module according to a shift of the pointing device, where the shift of the pointing device is referenced according to an initial point in a 3D (three-dimensional) spatial reference frame;

Step S902: updating a position of the initial point in the 3D spatial reference frame according to an updating signal.

In step S901, the operating method 900 controls movement of the cursor in the user interface reference frame displayed on the display module according to the shift of the pointing device in the 3D spatial reference frame, and is referenced according to the initial point in the 3D spatial reference frame. For instance, when the pointing device moves for a first predetermined distance towards a direction×relative to the initial point in the 3D spatial reference frame, the operating method 900 controls the cursor in the user interface reference frame to move for a second predetermined distance towards the direction x, where the first predetermined distance and the second predetermined distance can be proportional to each other.

In step S902, the operating method 900 updates the position of the initial point in the 3D spatial reference frame according to the updating signal. In other words, when the updating signal is received, the operating method 900 updates the position of the initial point in the 3D spatial reference frame. When the updating signal is not received, the operating method 900 keeps the position of the initial point in the 3D spatial reference frame unchanged. Hence the 3D spatial reference frame and the relative initial point are not stationary. The 3D spatial reference frame and the relative initial point can be moved according to the updating signal. This way, the 3D spatial reference frame and the relative initial point can be adjusted according to the shift of the pointing device, for solving the issue of requiring reset/recalibration when the shift of the pointing device is too large in the prior art. Conditions of generating the updating signal and details of updating the position of the initial point of the 3D spatial reference frame are described below.

Figure 5A:
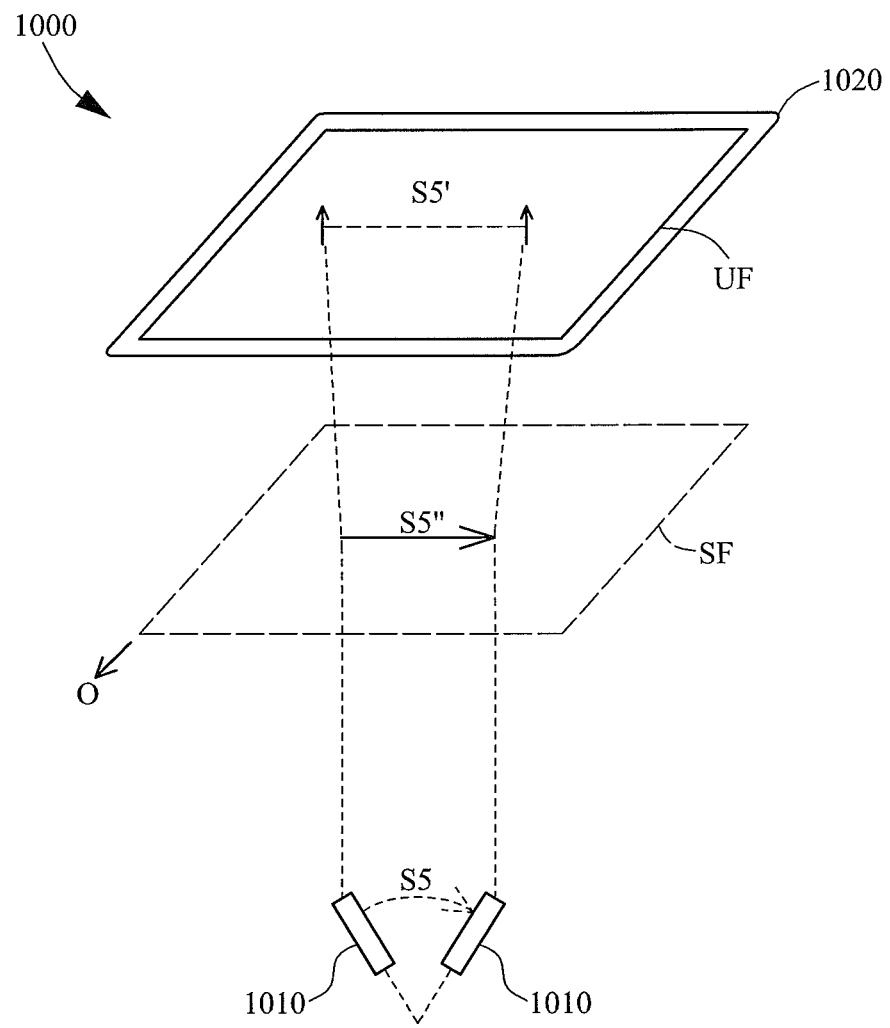
FIG. 5A and FIG. 5B are diagrams illustrating a multimedia interactive system under the first condition for generating the updating signal according to the first embodiment of the present invention.
Figure 5B:
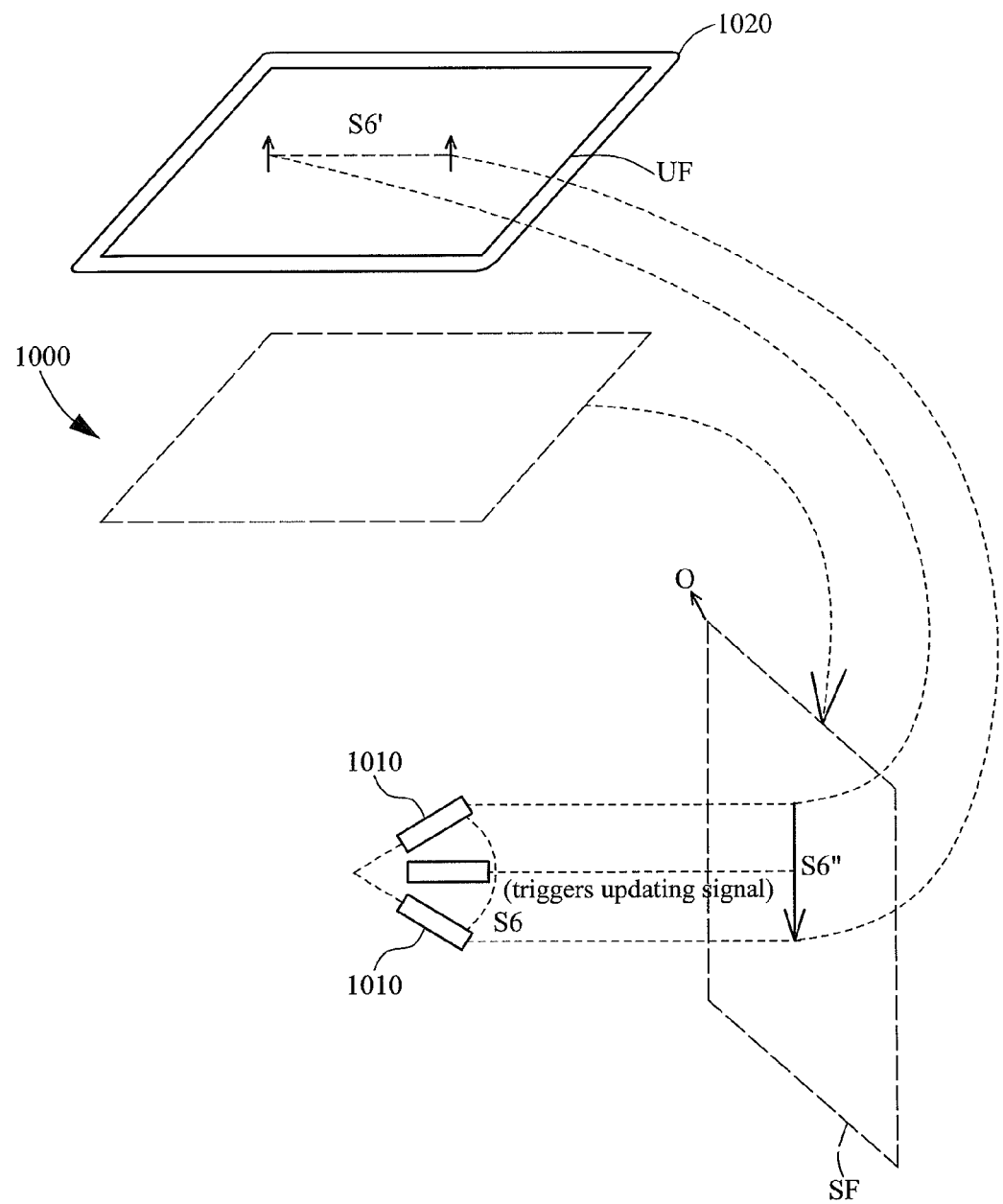

A first condition for generating the updating signal is when a user self-triggers the updating signal. One example is when the user has pressed a reset button on the pointing device. In such circumstance, when the updating signal is received, the operating method 900 detects current position and current direction of the pointing device, for replacing an initial position of an initial point O with the detected position and direction of the pointing device. FIG. 5A and FIG. 5B are diagrams illustrating a multimedia interactive system 1000 under the first condition for generating the updating signal according to the first embodiment of the present invention. FIG. 5A is a diagram illustrating a position and a relative initial point O of a 3D spatial reference frame SF in a default condition. FIG. 5B is a diagram illustrating the 3D spatial reference frame SF and the relative initial point O being moved after the user has triggered the updating signal. The multimedia interactive system 1000 comprises a pointing device 1010 and a display device 1020.

In FIG. 5A, operating range of the pointing device 1010 is slightly faced towards the display device 1020 (i.e. the display device 1020 displays a user interface reference frame UF and a cursor), so the 3D spatial reference frame SF utilized by the pointing device 1010 and the relative initial point O are also closer to the display device 1020. When the user turns the pointing device 1010 to a direction that is away from the display device 1020, the user can press the reset button for self-triggering the updating signal. At this moment the 3D spatial reference frame SF and the relative initial point O will move according to the current position/direction of the pointing device 101, resulting in a setup shown in FIG. 5B.

In FIG. 5B, the pointing device 1010 has turned towards a position/direction that is away from the display device 1020, and the user can press the reset button for self-triggering the updating signal. Preferably, when the updating signal is generated, the position the pointing device 1010 points to corresponds to a center of the 3D spatial reference frame SF, and the cursor is also reset to a center of a user interface reference frame UF (i.e. a center of the display device 1020). In FIG. 5B, after the user pressed the reset button for the first time to trigger the updating signal, if the user continues to turn the pointing device 1010, the user can press the reset button again to trigger the updating signal once again, so as to again move the 3D spatial reference frame SF and the relative initial point O to the position the pointing device 1010 points to.

In FIG. 5A, the pointing device 1010 rotates for an angle S5, for generating a shift S5" in the 3D spatial reference frame SF, so the cursor in the user interface reference frame UF displayed on the display device 1020 also make a shift S5' accordingly. In FIG. 5B, the pointing device 1010 has turned towards a position/direction that is away from the display device 1020 and rotates for an angle S6. At this moment the 3D spatial reference frame SF has already been adjusted by the updating signal, and a shift S6" is generated in the 3D spatial reference frame, allowing the cursor to also make a shift S6' in the user interface reference frame UF accordingly, so the cursor does not stop at a border of the user interface reference frame UF.

Further, the pointing device 1010 is initially at a position L5 and points to the user interface reference frame UF, and then the pointing device 1010 is moved to a position L6 but still points to the user interface reference frame UF. At this moment, the user can press the reset button for a first time to trigger the updating signal, so as to move the 3D spatial reference frame SF and the relative initial point O to the position pointed by the pointing device 1010 in a position L6. The pointing device 1010 is then moved to a position L7 and still points to the user interface reference frame UF. At this moment the user can press the reset button for a second time to trigger the updating signal, so as to again move a position of the 3D spatial reference frame SF and the relative initial point O to a position pointed by the pointing device 1010 in a position L7.

A second condition for generating the updating signal is when a shift of the pointing device has exceeded a border of the 3D spatial reference frame. In such circumstance, when the updating signal is received, the operating method 900 takes part of the shift of the pointing device exceeding the border of the 3D spatial reference frame into consideration, and selectively moves the initial point of the 3D spatial reference frame according to direction and magnitude of the part of the shift of the pointing device exceeding the border of the 3D spatial reference frame. For instance, if the pointing device exceeds the border of the 3D spatial reference frame for 1 unit in a direction x, the operating method 900 can accordingly move the initial point of the 3D spatial reference frame for 1 unit in the direction x. If the pointing device exceeds the border of the 3D spatial reference frame for 10 units in the direction x, the operating method 900 can accordingly move the initial point of the 3D spatial reference frame for 10 units in the direction x. Hence it can be observed that the magnitude of the operating method 900 moves the initial point of the 3D spatial reference frame is directly proportional to that of shift of the pointing device.

In the first condition and the second condition for generating the updating signal mentioned above, settings of the border of the 3D spatial reference frame can be determined by the user, or can be set according to the border of the user interface reference frame. If the user chooses to set the border of the 3D spatial reference frame according to the border of the user interface reference frame, the operating method 900 further requires to detect a resolution of the display module which displays the user interface reference frame, for obtaining the border of the user interface reference frame. The operating method 900 then sets the border of the 3D spatial reference frame to correspond to the border of the user interface reference frame. This way, when the cursor is at the border of the user interface reference frame, the pointing device is also at the border of the 3D spatial reference frame correspondingly. In other words, when the pointing device is moved to the border of the 3D spatial reference frame, the position of the pointing device corresponds to a position of the cursor which has accordingly moved to the border of the user interface reference frame. For instance, assuming the initial point of the 3D spatial reference frame corresponds to a lower left corner of the user interface reference frame, so when the pointing device is at the initial point of the 3D spatial reference frame, the cursor is at the corresponding lower left corner of the user interface reference frame.

Figure 6A:
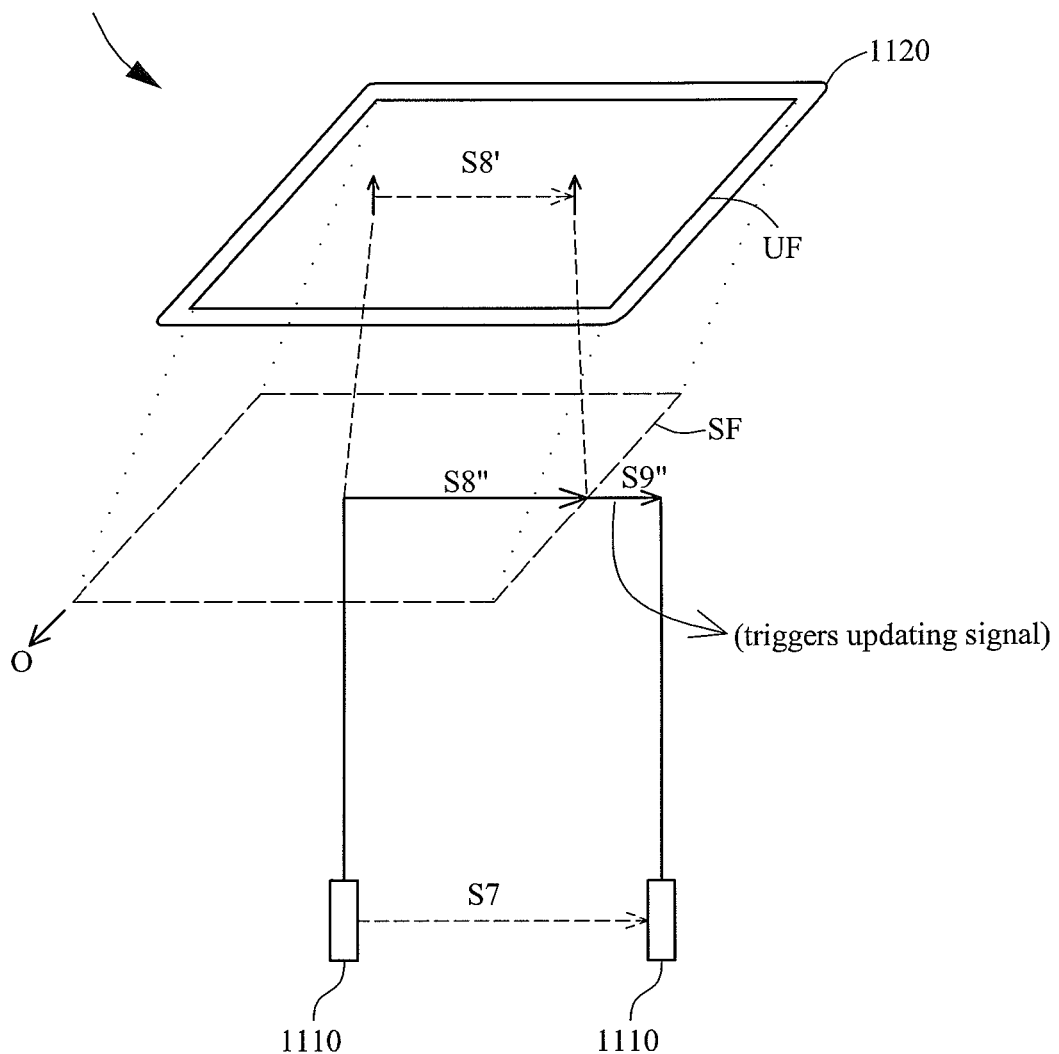
Figure 6C:
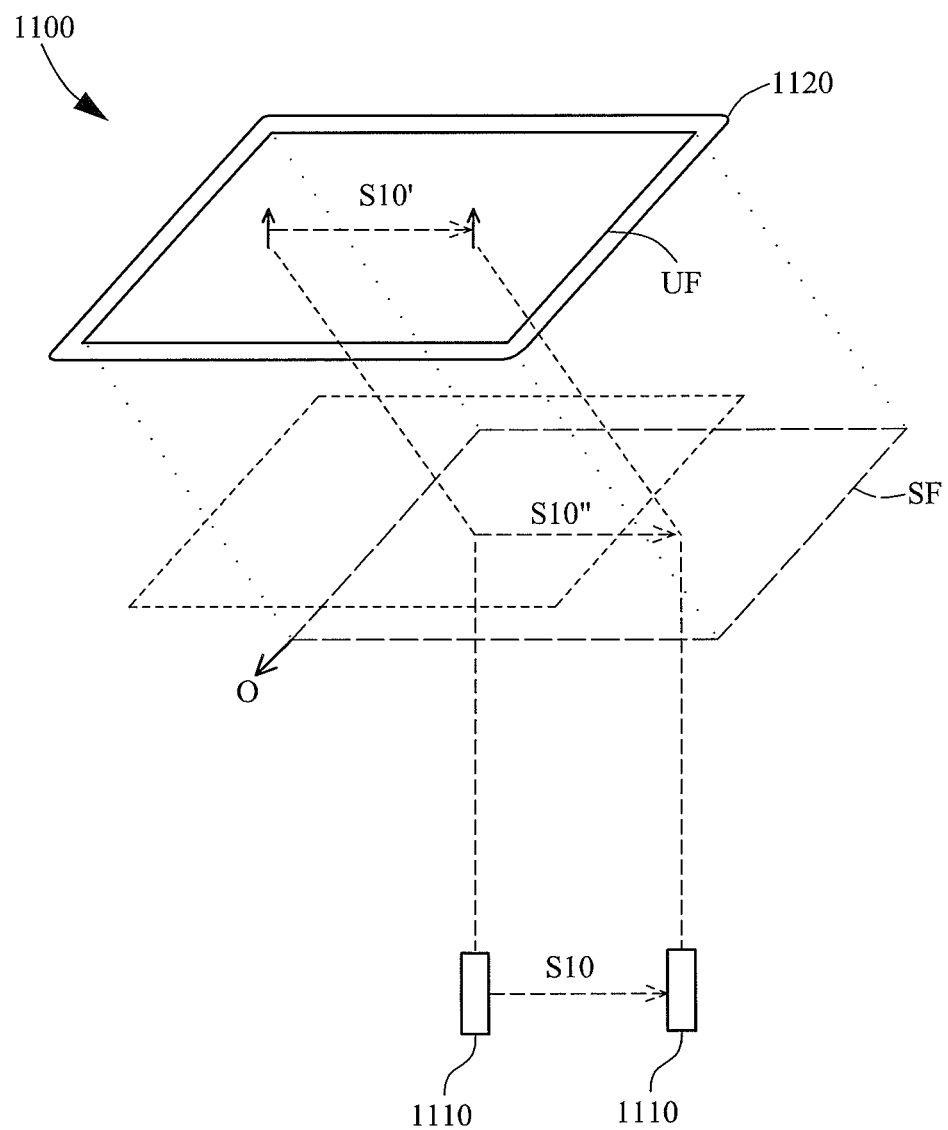

FIG. 6B and FIG. 6C are diagrams illustrating a multimedia interactive system 1100 under the second condition for generating the updating signal according to the first embodiment of the present invention. FIG. 6A is a diagram illustrating a position and a relative initial point O of a 3D spatial reference frame SF in a default condition. FIG. 6B is a diagram illustrating the pointing device has exceeded the border of the 3D spatial reference frame and triggers the updating signal. FIG. 6C is a diagram illustrating the position and the relative initial point O of the 3D spatial reference frame SF being moved according to the shift of the pointing device.

The multimedia interactive system 1100 comprises a pointing device 1110 and a display device 1120. Preferably, a border of the 3D spatial reference frame SF utilized by the pointing device 1110 is set according to a border of the user interface reference frame UF of the display device 1120. In FIG. 6A, operating range of the pointing device 1110 is slightly faced towards the display device 1020 (i.e. the display device 1120 displays the user interface reference frame UF and a cursor), so the 3D spatial reference frame SF and the relative initial point O are also closer to the display device 1120. In FIG. 6A, a shift of the pointing device 1110 is S7. A shift corresponding to the shift S7 in the 3D spatial reference frame SF has exceeded the border of the 3D spatial reference frame SF, hence the updating signal is triggered. The part of the shift that exceeds the border of the 3D spatial reference frame SF is S9" and the part of the shift that is within the border of the 3D spatial reference frame SF is S8". This way, the operating method 900 can selectively determine whether to move the cursor for the cursor to generate a shift S8', according to the corresponding shift S8". For instance, the operating method 900 can move the cursor for the cursor to generate a shift S8', according to the corresponding shift S8". Alternatively, the operating method 900 can neglect the shift S8" and does not move the cursor, and the shift S9" (which is the part exceeds the border of the 3D spatial reference frame SF) can be provided to the operating method 900 as a reference to move the 3D spatial reference frame SF and the relative initial point O.

In FIG. 6B, the operating method 900 makes the 3D spatial reference frame SF and the relative initial point O to shift for S9" to correspond to the pointing device 1110 in the new position. This way, probability of the pointing device 1110 exceeding the 3D spatial reference frame SF again is reduced, preventing occurrence of when the pointing device 1110 moves and the cursor does not move due to being limited by the user interface reference frame UF. In FIG. 6C, the 3D spatial reference frame SF and the relative initial point O have already made the shift S9". At this moment, the pointing device 1110 is moved again to generate a shift S10. Since the 3D spatial reference frame SF and the relative initial point O have already been moved according to the position of the pointing device 1110, the shift S10 will be within the border of the 3D spatial reference frame SF which is at the new position, so as to generate a shift S10" in the 3D spatial reference frame of the new position. The operating method 900 can then move the cursor for the cursor to generate a shift S10' according to the shift S10".

Further, shift of the 3D spatial reference frame SF and the relative initial point O can be proportional to part of shift of the pointing device exceeding the border. For instance, if a shift of the pointing device has exceeded the border for 10 units, a shift of the 3D spatial reference frame SF and the relative initial point O is 1 unit. Alternatively, the operating method 900 can be set so that the updating signal is triggered for moving the 3D spatial reference frame SF and the relative initial point O, when a shift of the pointing device exceeding the border of the 3D spatial reference frame SF is larger than a first predetermined value. This way, when the shift of the pointing device exceeding the border of the 3D spatial reference frame SF is smaller than the first predetermined value, the operating method 900 does not move the 3D spatial reference frame SF and the relative initial point O.

Alternatively, the operating method 900 can be set so that the updating signal is triggered for moving the 3D spatial reference frame SF and the relative initial point O, when a number of times the shift of the pointing device exceeding the border of the 3D spatial reference frame SF is larger than a second predetermined value in a set duration. This way, when the number of times the shift of the pointing device exceeding the border of the 3D spatial reference frame SF is smaller than the second predetermined value in the set duration, the operating method 900 does not move the 3D spatial reference frame SF and the relative initial point O.

Figure 7:
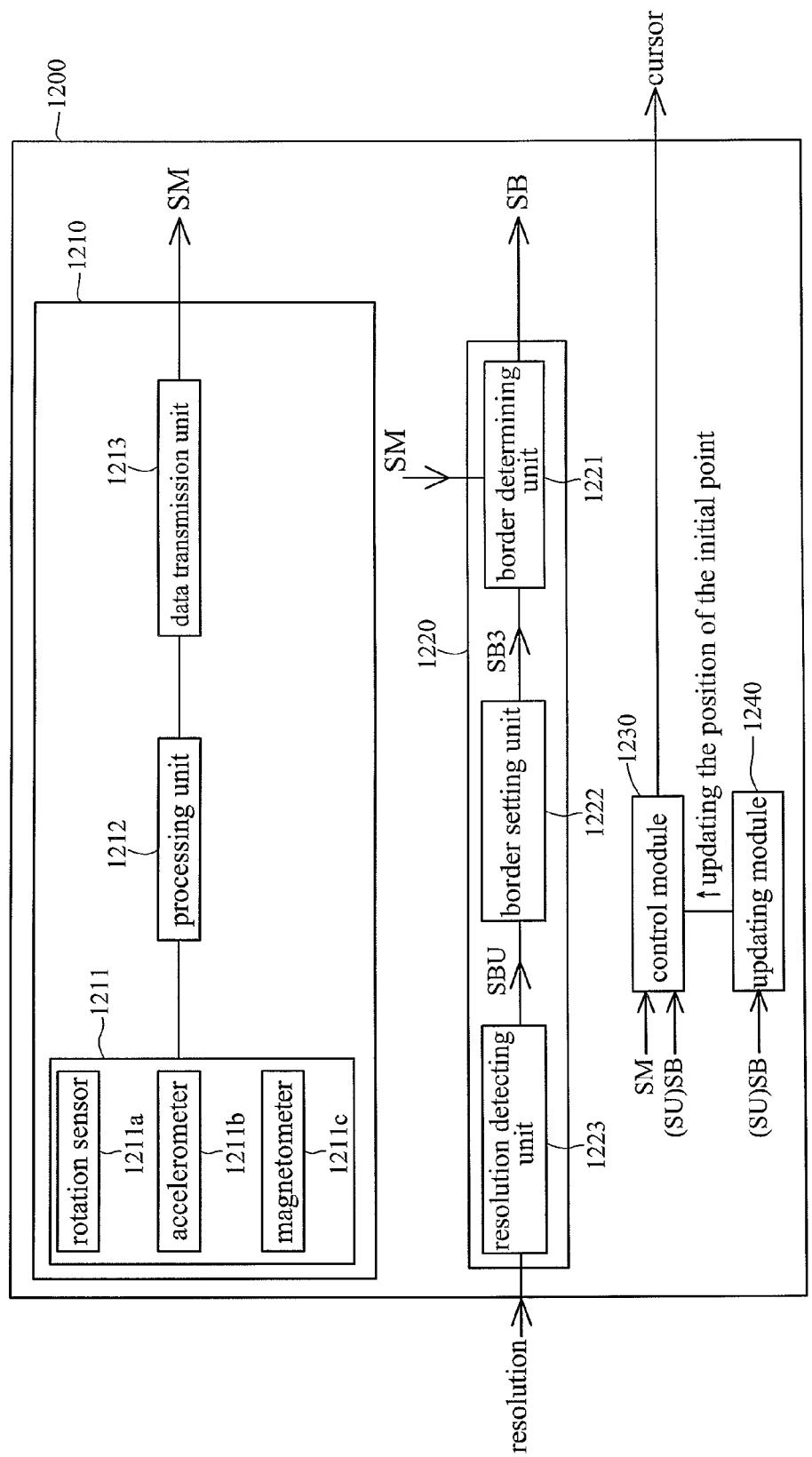
FIG. 7 is a diagram illustrating a pointing device according to the first embodiment of the present invention.

Please refer to FIG. 7. FIG. 7 is a diagram illustrating a pointing device 1200 according to the first embodiment of the present invention. As shown in FIG. 7, the pointing device 1200 comprises a pointing module 1210, a control module 1230 and an updating module 1240. The pointing device 1200 can be an air mouse, a remote controller, a control handle of a gaming console or a laser pointer, etc., for controlling a cursor of a user interface reference frame displayed on a display device. Further, the pointing device 1200 can selectively comprise s border module 1220. For instance, if the pointing module 1200 is applied to the first condition for generating an updating signal as mentioned above, the pointing device 1200 does not require to comprise the border module 1220. On the other hand, if the pointing device 1200 is applied to the second condition for generating the updating signal as mentioned above, the pointing device 1200 then requires to comprise the border module 1220.

The pointing module 1210 detects and stores a shift/position of the pointing module 1210 in the 3D spatial reference frame. The pointing module 1210 comprises a motion sensing unit 1211, a processing unit 1212 and a data transmission unit 1213. The motion sensing unit 1211 comprises a rotation sensor 1211a, an accelerometer 1211b and/or a magnetometer 1211c. The rotation sensor 1211 detects rotating behavior of the pointing module 1210. The accelerometer 1211b detects acceleration of the pointing module 1210. The magnetometer 1211c determines a position of the pointing module 1210 according to earth's magnetic field (i.e. detecting force of the earth's magnetic field). The processing unit 1212 performs an algorithm calculation to data obtained by the rotation sensor 1211a, the accelerometer 1211b and/or the magnetometer 1211c, for obtaining a shift signal SM. The data transmission unit 1213 then transmits the shift signal SM obtained to the border module 1220, the control module 1230 and the updating module 1240.

Further, the motion sensing unit 1211 can be realized with the rotation sensor and the accelerometer only, without the magnetometer. More specifically, when the motion sensing unit 1211 is a six-axis sensing unit, the motion sensing unit 1211 can be realized with only the rotation sensor and the accelerometer, but such setup is unable to detect the absolute position. When the motion sensing unit 1211 is a nine-axis sensing unit, the motion sensing unit 1211 then requires rotation sensor, the accelerometer and the magnetometer to be realized, so the absolute position can be detected.

The border module 1220 detects whether the cursor being controlled has reached a border of the user interface reference frame displayed on the display module, so as to generate the updating signal SU and accordingly notify the updating module 1240 to whether update position of an initial point of the 3D spatial reference frame or not, where the display module displays the user interface reference frame and the cursor. The border module 1220 comprises a border determining unit 1221, a border setting unit 1222 and a resolution detecting unit 1223. The border determining unit 1221 receives the shift signal SM, for determining whether the position/shift of the pointing module 1210 is within the border of the 3D spatial reference frame, so as to transmit a border determining signal SB accordingly. In addition, the border determining signal SB can be utilized as the updating signal SU, for notifying the updating module 1240.

The border setting unit 1222 sets the border of the 3D spatial reference frame utilized by the pointing module 1210, and sets the border of the 3D spatial reference frame to correspond to the border of the user interface reference frame. This way, when the position/shift of the pointing module 1210 is at the border of the 3D spatial reference frame, the corresponding position of the cursor is also at the border of the user interface reference frame displayed on the display module.

The resolution detecting unit 1223 detects a resolution of the display module. The resolution of the display module is utilized for determining the border of the user interface reference frame. The resolution detecting unit 1223 generates a user interface reference frame border signal SBU according to the resolution of the display module and provides the user interface reference frame border signal SBU to the border setting unit 1222. In other words, the resolution detecting unit 1223 transmits border data of the user interface reference frame to the border setting unit 1222 via the user interface reference frame border signal SBU, according to the resolution of the display module. The border setting unit 1222 can then set the border of the 3D spatial reference frame according to the border of the user interface reference frame obtained, for generating a 3D spatial reference frame border signal SB3 and the 3D spatial reference frame border signal SB3 is provided to the border determining unit 1221.

This way, when the shift signal SM indicates the shift of the pointing module 1210 is within the border of the 3D spatial reference frame, meaning the cursor is within the border of the user interface reference frame, the border determining unit 1221 does not output the border determining signal SB (i.e. the updating signal SU). In contrast, when the shift signal SM indicates the shift of the pointing module 1210 has exceeded the border of the 3D spatial reference frame, meaning the cursor has reached the border of the user interface reference frame, the border determining unit 1221 then outputs the border determining signal SB (i.e. the updating signal SU).

The control module 1230 controls the shift of the cursor in the user interface reference frame, according to the shift signal SM and a relation between the cursor and the user interface reference frame detected by the border module 1220. More specifically, when the control module 1230 has not received the border determining signal SB, meaning the cursor is still within the user interface reference frame and has not reached the border of the user interface reference frame, the control module 1230 controls the shift of the cursor according to the shift signal SM. On the other hand, when the control module 1230 has received the border determining signal SB, meaning the cursor has reached the border of the user interface reference frame, the control module 1230 can "selectively" stop controlling the cursor.

The updating module 1240 updates the position of initial point of the 3D spatial reference frame according to the updating signal SU. As mentioned above, the updating module 1240 can comprise two implementation embodiments. Under the condition of generating the updating signal SU by the user pressing the reset button, when the updating module 1240 receives the updating signal SU, the updating module 1240 detects a current position of the pointing module 1210 and replaces position of the initial point of the 3D spatial reference frame with the detected position. Under the condition of generating the updating signal SU by the border module 1220, when the updating module 1240 receives the updating signal SU, the updating module 1240 moves the position of the initial point of the 3D spatial reference frame according to the shift of the pointing device 1210. More specifically, when the shift of the pointing module 1210 is a first direction, and a magnitude of the part of shift of the pointing device 1210 exceeding the border of the 3D spatial reference frame is a third predetermined value, the updating module 1240 moves the initial point of the 3D spatial reference frame with a magnitude of a fourth predetermined value towards the first direction, where the third predetermine value is proportional to the fourth predetermined value. This way, when the user moves the pointing device 1200 of the present embodiment towards a certain direction continuously, the 3D spatial reference frame and the relative initial point utilized by the pointing device 1200 are moved towards the certain direction accordingly, for preventing the cursor displayed on the user interface reference frame from staying still (e.g. due to without reset/recalibrate offset) on the border of the user interface reference frame.

Figure 8:
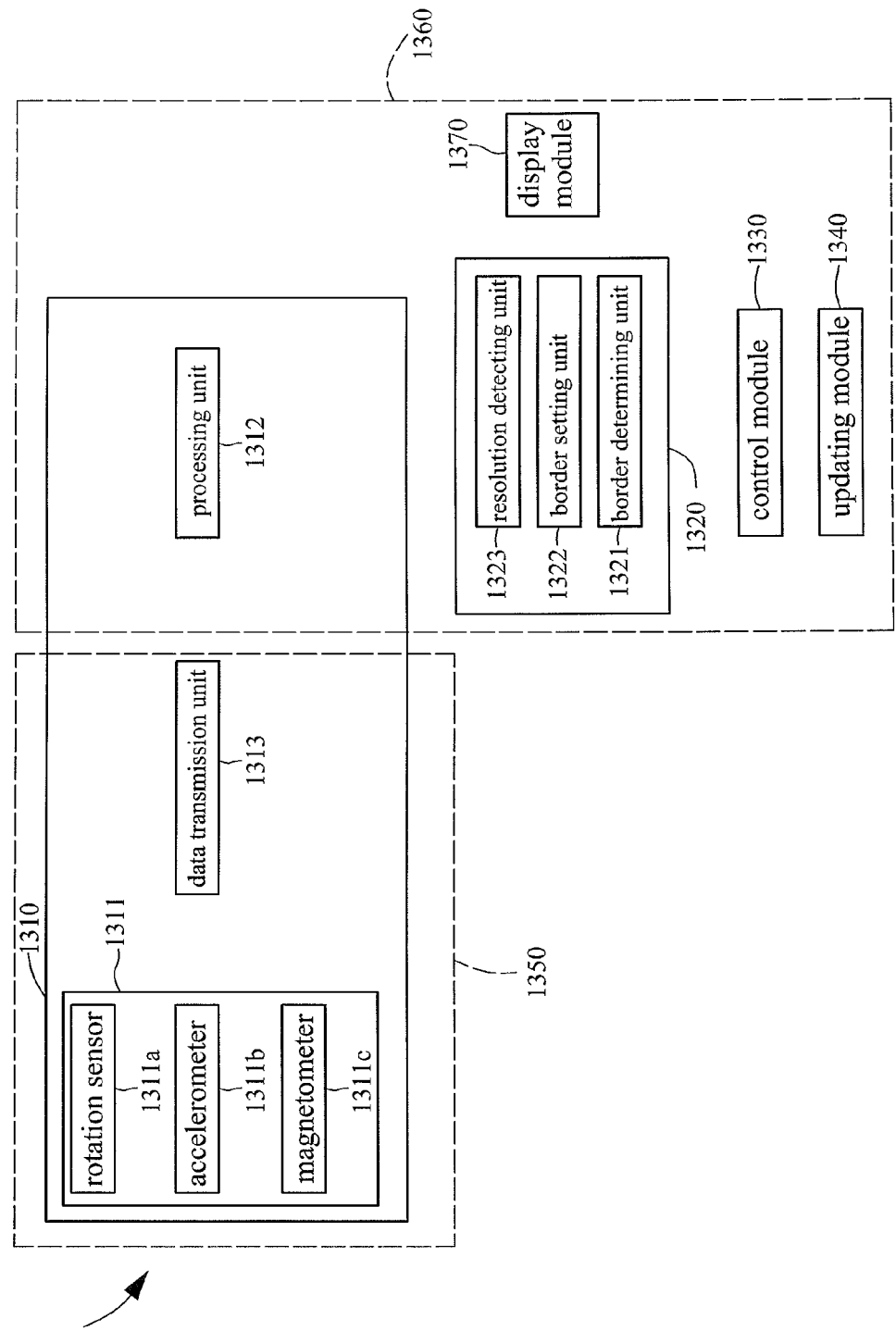
FIG. 8 is a diagram illustrating a multimedia interactive system according to the first embodiment of the present invention.

Please refer to FIG. 8. FIG. 8 is a diagram illustrating a multimedia interactive system 1300 according to the first embodiment of the present invention. The multimedia interactive system 1300 comprises a pointing module 1310, a border module 1320, a control module 1330, an updating module 1340 and a display module 1370. The pointing module 1310 comprises a motion sensing unit 1311*a*, a processing unit 1312 and a data transmission unit 1313. The motion sensing unit 1311 comprises a rotation sensor 1311*a*, an accelerometer 1311*b* and/or a magnetometer 1311*c*. The border module 1320 comprises a border determining unit 1321, a border setting unit 1322 and a resolution detecting unit 1323. The components mentioned above are similar to those mentioned in previous paragraphs, so relative descriptions are omitted hereinafter. The multimedia interactive system 1300 further comprises a pointing device 1350 and a display device 1360. When the pointing device 1350 comprises the pointing module 1310, the border module 1320, the control module 1330 and the updating module 1340, the display device 1360 only needs to comprise the display module 1370, but a pointing device with such setup consumes more power.

Alternatively, the pointing device 1350 can only comprise the motion sensing unit 1311 of the pointing module 1310 and the data transmission unit 1313, and dispose the processing unit 1312 of the pointing module 1310, the border module 1320, the control module 1330, the updating module 1340 and the display module 1370 in the display device 1360 (as shown in FIG. 8), for decreasing power consumption of the pointing device. However, such setup will cause the data obtained by the rotation sensor 1311*a*, the accelerometer 1311*b* and/or the magnetometer 1311*c* to directly transmit, via either wired or wireless transmission, to the processing unit 1312 for processing, so as to obtain the shift signal SM. In other words, in such setup, the data transmission unit 1313 directly transmits, via either wired or wireless transmission, the data detected by the motion sensing unit to the display device 1360. In the display device 1360, the processing unit 1312 can then receive, via either wired or wireless transmission, the data transmitted by the data transmission unit 1313 and perform the algorithm calculation, for generating the shift of the pointing module 1310 and then transmits the shift to the control module 1330.

In conclusion, when the operating range is changed, the pointing device of the present invention appropriately adjusts reference coordinates utilized by the pointing device, so as to lower the affect of offset, allowing the pointing device to be applied in different areas/directions without having the cursor displayed on the display device to incorrectly reflect shift of the pointing device.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. An operating method of a pointing device, comprising:
   controlling a shift of a cursor in a user interface reference frame according to a shift of the pointing device with reference to an initial point in a 3D (three-dimensional) spatial reference frame;
   updating a position of the initial point in the 3D spatial reference frame according to an updating signal;
   setting a border of the 3D spatial reference frame;
   generating the updating signal when the shift of the pointing device exceeds the border; and
   moving the position of the initial point in the 3D spatial reference frame according to the shift of the pointing device, when receiving the updating signal.

2. The operating method of claim 1, wherein updating the position of the initial point in the 3D spatial reference frame according to the updating signal comprises:
   detecting a position of the pointing device when receiving the updating signal; and
   replacing the position of the initial point in the 3D spatial reference frame according to the position detected of the pointing device.

3. The operating method of claim 1, wherein moving the position of the initial point in the 3D spatial reference frame according to the shift of the pointing device comprises:
   moving the position of the initial point in the 3D spatial reference frame according to a first direction, when the shift of the pointing device is the first direction; and
   a magnitude of moving the position of the initial point in the 3D spatial reference frame is directly proportional to the shift of the pointing device.

4. The operating method of claim 1, wherein setting the border of the 3D spatial reference frame comprises:
   detecting a resolution of a display module for obtaining a border of the user interface reference frame; and
   setting the border of the 3D spatial reference frame to correspond to the border of the user interface reference frame, so when the cursor is at the border of the user interface reference frame, the pointing device is at the border of the 3D spatial reference frame.

* * * * *